Patented Feb. 24, 1942

2,273,880

UNITED STATES PATENT OFFICE 2,273,880

MOISTUREPROOF SHEET WRAPPING MATERIAL

James A. Mitchell, Kenmore, N. Y., assignor to E. I. du Pont de Nemours & Company, Wilmington, Del., a corporation of Delaware No Drawing. Application November 1, 1939, Serial No. 302,318

10 Claims. (Cl. 91—68)

This invention relates to moistureproof sheet wrapping material, and more particularly to the moisture-proofing of regenerated cellulose and like film. It especially appertains to the anchoring of moistureproof coatings to the base sheet.

Recently there has appeared in commerce a transparent moistureproof sheet wrapping material consisting of a base sheet of regenerated cellulose film coated with a moistureproofing coating composition. The manufacture of such a base sheet is described in U. S. A. Patent No. 1,548,864 (Brandenberger), and the coating of the like with a moistureproofing composition is described in U. S. A. Patent No. 1,737,187 (Charch & Prindle). When products containing considerable water (cheese, fish, fresh vegetables, etc.) are wrapped in such material, the surface coating loosens in a few hours. As a result, the effectiveness of the wrapping is very appreciably reduced. Among the various plans which have been proposed for avoiding or overcoming this failing is that of anchoring the moisture-proof coating to the base sheet by means of an intermediate coat. Details of such procedures are disclosed in U. S. A. Patent 1,962,338 (Charch).

The primary objects of this invention were to improve transparent sheet wrapping materials having anchored moistureproof coatings and the processes of their production. Another object was the production of a flexible, odorless, colorless, transparent, moisture-proof sheet wrapping material comprising a regenerated cellulose film having a moistureproofing coating which would adhere tenaciously thereto even in the presence of water. Further objects were to devise a simple process applicable to existing and conventional equipment for anchoring moistureproofing coatings to regenerated cellulose and like film, to devise an efficient and economical process applicable to high speed coating equipment for anchoring moistureproofing coatings to regenerated cellulose, to improve the anchorage of moistureproof coatings comprising a film former, a moistureproofing agent, a blending agent and a plasticizer to regenerated cellulosic film, to produce a moistureproofed regenerated cellulose film having a harder and more wear-resistant coating than heretofore obtainable with the coating compositions containing anchoring media having drying characteristics, to produce a moistureproofed regenerated cellulose film having a completely odorless anchoring medium with drying characteristics, and to anchor a moistureproofing coating to a regenerated cellulose film with a butadiene polymer. A general advance in the art, and other objects which will appear hereinafter, are also contemplated.

Surprisingly, it has now been found that an intermediate coating of a butadiene polymer having drying characteristics will securely adhere a moistureproofing coating to regenerated cellulose film, and that the resulting moistureproof sheet wrapping material is greatly superior to the products heretofore known.

In general, coatings of such material are produced by dispersing the diolefinic hydrocarbon polymer together with modifying agents (if they are desired) in a suitable organic liquid solvent, applying the same to a regenerated cellulose web, heating to a suitable temperature in air or oxygen (preferably at about 100° C.) until the polymer is "cured" and the coating relatively non-tacky, and thereafter top coating with a moistureproofing lacquer of any desired type. The use of a drying catalyst in the intermediate coating composition is preferred.

From the following description and specific examples, in which are disclosed certain embodiments of the invention as well as details as what is believed to be the best mode for carrying out the invention, it will be aparent how the foregoing objects and related ends are accomplished. The parts are given by weight throughout the application.

*Example I*

A web of regenerated cellulose was coated with a solution consisting of:

| | Parts |
|---|---|
| Butadiene polymer | 5 |
| Cobalt naphthenate (as Co) | 0.005 |
| Toluene | 95 |

The solvent was evaporated at about 100° C., and the coated sheet maintained at this temperature until "cured," that is, until the coating had become relatively non-tacky. This required approximately 10 minutes. The resulting web was then top coated with a moistureproofing lacquer having the composition:

| | Parts |
|---|---|
| Nitrocellulose (11.6% N) | 60 |
| Paraffin wax (M. P. 60° C.) | 3 |
| Ester gum | 7 |
| Dicyclohexyl phthalate | 20 |
| Dibutyl phthalate | 10 |
| Ethyl acetate | 450 |
| Ethyl alcohol | 35 |
| Toluene | 245 |

After application of the surface coating composition the resulting material was subjected to a temperature approximating (or slightly higher than) the melting point of the wax (for specific details see U. S. A. Patent 1,826,699 to Charch & Prindle). The resulting sheet material had a permeability value of 20, and the moistureproofing coating was still anchored to the base sheet of regenerated cellulose after being immersed in water at 25° for 168 hours.

*Example II*

A web of regenerated cellulose was coated with a solution consisting of:

| | Parts |
|---|---|
| Butadiene polymer | 3 |
| Polymerized styrene | 2 |
| Cobalt naphthenate (as Co) | 0.005 |
| Toluene | 95 |

The solvent was evaporated at about 100° C., and the coated sheet maintained at this temperature until "cured". This required approximately 10 minutes. The resulting web was then top coated with a moistureproofing lacquer having the composition:

| | Parts |
|---|---|
| Nitrocellulose (11.6% N) | 60 |
| Paraffin wax (M. P. 60° C.) | 3 |
| Ester gum | 7 |
| Dicyclohexyl phthalate | 20 |
| Dibutyl phthalate | 10 |
| Ethyl acetate | 450 |
| Ethyl alcohol | 35 |
| Toluene | 245 |

After application of the surface coating composition the resulting material was subjected to a temperature approximating (or slightly higher than) the melting point of the wax (for specific details see U. S. A Patent 1,826,699—Charch & Prindle). The resulting sheet material had a permeability value of 45, and the moistureproofing coating was still anchored to the base sheet of regenerated cellulose after being immersed in water at 25° C. for 168 hours.

*Example III*

A web of regenerated cellulose was coated with a solution consisting of:

| | Parts |
|---|---|
| Butadiene polymer | 9 |
| Paraffin wax (M. P. 60° C.) | 1 |
| Cobalt naphthenate (as Co) | 0.03 |
| Toluene | 90 |

The solvent was evaporated at about 100° C., and the coated sheet maintained at this temperature until "cured." This required approximately 10 minutes. The resulting web was then top coated with a moistureproofing lacquer having the composition:

| | Parts |
|---|---|
| Nitrocellulose (11.6% N) | 60 |
| Paraffin wax (M. P. 60° C.) | 3 |
| Ester gum | 7 |
| Dicyclohexyl phthalate | 20 |
| Dibutyl phthalate | 10 |
| Ethyl acetate | 450 |
| Ethyl alcohol | 35 |
| Toluene | 245 |

After application of the surface coating composition the resulting material was subjected to a temperature approximating (or slightly higher than) the melting point of the wax. The resulting sheet material had a permeability value of 20, and the moistureproofing coating was still anchored to the base sheet of regenerated cellulose after being immersed in water at 25° C. for 120 hours.

*Example IV*

A web of regenerated cellulose was coated with a solution consisting of:

| | Parts |
|---|---|
| Butadiene polymer | 9 |
| Paraffin wax (M. P. 60° C.) | 1 |
| Cobalt naphthenate (as Co) | 0.005 |
| Manganese naphtenate (as Mn) | 0.005 |
| Toluene | 90 |

The solvent was evaporated at about 100° C., and the coated sheet maintained at this temperature until "cured", that is, until the coating had become relatively non-tacky. This required approximately 6 minutes. The resulting web was then top coated with a moistureproofing lacquer having the composition:

| | Parts |
|---|---|
| Ethyl cellulose (45%–48% ethoxy) | 55 |
| Paraffin wax (M. P. 60° C.) | 5 |
| Ester gum | 25 |
| Dicyclohexyl phthalate | 15 |
| Toluene | 580 |
| Ethyl alcohol | 150 |

After application of the surface coating composition the resulting material was subjected to a temperature approximating (or slightly higher than) the melting point of the wax. The resulting sheet material had a permeability value of 2, and the moistureproofing coating was still anchored to the base sheet of regenerated cellulose after being immersed in water at 25° C. for 72 hours.

*Example V*

A web of regenerated cellulose was coated with a solution consisting of:

| | Parts |
|---|---|
| Butadiene polymer | 9 |
| Paraffin wax (M. P. 60° C.) | 1 |
| Cobalt naphthenate (as Co) | 0.005 |
| Manganese naphtenate (as Mn) | 0.005 |
| Toluene | 90 |

The solvent was evaporated at about 100° C., and the coated sheet maintained at this temperature until "cured," that is, until the coating had become relatively non-tacky. This required approximately 6 minutes. The resulting web was then top coated with a moistureproofing lacquer having the composition:

| | Parts |
|---|---|
| Butyl methacrylate polymer | 95 |
| Paraffin wax (M. P. 60° C.) | 5 |
| Toluene | 730 |

After application of the surface coating composition the resulting material was subjected to a temperature approximating (or slightly higher than) the melting point of the wax. The resulting sheet material had a permeability value of 260, and the moistureproofing coating was still anchored to the base sheet of regenerated cellulose after being immersed in water at 25° C. for 72 hours.

Example VI

A web of regenerated cellulose was coated with a solution consisting of:

| | Parts |
|---|---|
| Butadiene polymer | 9 |
| Paraffin wax (M. P. 60° C.) | 1 |
| Cobalt naphthenate (as Co) | 0.005 |
| Manganese naphthenate (as Mn) | 0.005 |
| Toluene | 90 |

The solvent was evaporated at about 100° C., and the coated sheet maintained at this temperature until "cured," that is, until the coating had become relatively non-tacky. This required approximately 6 minutes. The resulting web was then top coated with a moistureproofing lacquer having the composition:

| | Parts |
|---|---|
| Pliolite * | 90 |
| Paraffin wax (M. P. 60° C.) | 10 |
| Toluene | 730 |

*"Pliolite" is a thermoplastic rubber derivative made by condensing rubber with a catalyst such as tin tetrachloride (see Paper Trade Journal page 96, February 23, 1939, J. I. E. C. XXVI, 125 and U. S. A. Patents Nos. 1,797,188, 1,846,247, 1,853,334 and 2,052,391). The chemical structure is also described in "Rubber Age," April 1939, and J. I. E. C. XIX. 1033.

After application of the surface coating composition the resulting material was subjected to a temperature approximating (or slightly higher than) the melting point of the wax. The resulting sheet material had a permeability value of 12, and the moistureproofing coating was still anchored to the base sheet of regenerated cellulose after being immersed in water at 25° C. for 72 hours.

Example VII

A web of regenerated cellulose was coated with a solution consisting of:

| | Parts |
|---|---|
| Butadiene polymer | 9 |
| Paraffin wax (M. P. 60° C.) | 1 |
| Cobalt naphthenate (as Co) | 0.005 |
| Manganese naphthenate (as Mn) | 0.005 |
| Toluene | 90 |

The solvent was evaporated at about 100° C., and the coated sheet maintained at this temperature until "cured," that is, until the coating had become relatively non-tacky. This required approximately 6 minutes. The resulting web was then top coated with a moistureproofing lacquer having the composition:

| | Parts |
|---|---|
| Chlorinated rubber (65%–68% Cl) | 60 |
| Paraffin wax (M. P. 60° C.) | 6 |
| Damar resin | 10 |
| Dicyclohexyl phthalate | 12 |
| Dibutyl phthalate | 12 |
| Toluene | 730 |

After application of the surface coating composition the resulting material was subjected to a temperature approximating (or slightly higher than) the melting point of the wax. The resulting sheet material had a permeability value of 440, and the moistureproofing coating was still anchored to the base sheet of regenerated cellulose after being immersed in water at 25° C. for 48 hours.

Example VIII

A web of regenerated cellulose was coated with a solution consisting of:

| | Parts |
|---|---|
| Butadiene polymer | 9 |
| Paraffin wax (M. P. 60° C.) | 1 |
| Manganese naphthenate (as Mn) | 0.01 |
| Toluene | 90 |

The solvent was evaporated and the coated sheet "cured" at about 100° C. This required approximately 5 minutes. The resulting web having only this single coat had a permeability value of 2, and the coating was still anchored to the base sheet after 96 hours' immersion in water at 25° C.

Example IX

A web of regenerated cellulose was coated with a solution consisting of:

| | Parts |
|---|---|
| Butadiene polymer | 9 |
| Paraffin wax (M. P. 60° C.) | 1 |
| Cobalt Oilsolate * (as Co) | 0.01 |
| Toluene | 90 |

*Cobalt Oilsolate is a synthetic oil-soluble drier. Its preparation is described in the patents cited in the J. I. E. C. XXVI 1268–71 article about its structure and properties.

The solvent was evaporated at about 100° C., and the coated sheet maintained at this temperature until "cured," that is, until the coating had become relatively non-tacky. This required approximately 7 minutes. The resulting web having only this single coat had a permeability value of 5, and the coating was still anchored to the base sheet of regenerated cellulose after being immersed in water at 25° C. for 144 hours.

Example X

A web of regenerated cellulose was coated with a solution consisting of:

| | Parts |
|---|---|
| Butadiene polymer | 40 |
| Paraffin wax (M. P. 60° C.) | 3 |
| Ethyl cellulose (45%–48% ethoxy) | 32 |
| Ester gum | 15 |
| Dicyclohexyl phthalate | 10 |
| Cobalt naphthenate (as Co) | 0.04 |
| Toluene | 580 |
| Ethyl alcohol | 150 |

The solvent was evaporated at about 100° C., and the coated sheet maintained at this temperature until "cured," that is, until the coating had become relatively non-tacky. This required approximately 3 minutes. The resulting web having only this single coat had a permeability value of 100, and the coating was still anchored to the base sheet of regenerated cellulose after being immersed in water at 25° C. for 23 hours.

When the same base sheet was coated under the same conditions with a similar composition, replacing the butadiene polymer with the ethyl cellulose, that is, a composition having 72 parts ethyl cellulose and the same amounts of paraffin wax, ester gum, dicyclohexyl phthalate, toluene and ethyl alcohol, a sheet was obtained which had a permeability value of 10, and which had its coating loosened by two hours immersion in water under the afore-mentioned conditions.

Example XI

A web of regenerated cellulose was coated with a solution consisting of:

| | Parts |
|---|---|
| Butadiene polymer | 30 |
| Paraffin wax (M. P. 60° C.) | 3 |
| Nitrocellulose (11.6% N) | 30 |
| Ester gum | 7 |
| Dicyclohexyl phthalate | 20 |
| Dibutyl phthalate | 10 |
| Manganese naphthenate (as Mn) | 0.08 |
| Toluene | 245 |
| Ethyl acetate | 450 |
| Ethyl alcohol | 35 |

The solvent was evaporated at about 100° C., and the coated sheet maintained at this temperature until "cured," that is, until the coating had become relatively non-tacky. This required approximately 8 minutes. The resulting web having only this single coat had a permeability value of 25, and the coating was still anchored to the base sheet of regenerated cellulose after being immersed in water at 25° C. for 24 hours.

When the same base sheet was coated under the same conditions with a similar composition, replacing the butadiene polymer with nitrocellulose, that is, a composition having 60 parts nitrocellulose and the same amounts of paraffin, ester gum, dicyclohexyl phthalate, dibutyl phthalate, toluene, ethyl acetate and ethyl alcohol, a sheet was obtained which had a permeability value of 20, and which had its coating loosened by 6 hours immersion in water under the aforementioned conditions.

Example XII

A web of regenerated cellulose was coated with a solution consisting of:

| | Parts |
|---|---|
| Butadiene polymer | 47 |
| Paraffin wax (M. P. 60° C.) | 6 |
| Butyl methacrylate polymer | 47 |
| Cobalt naphthenate (as Co) | 0.15 |
| Toluene | 730 |

The solvent was evaporated at about 100° C., and the coated sheet maintained at this temperature until "cured," that is, until the coating had become relatively non-tacky. This required approximately 8 minutes. The resulting web having only this single coat had a permeability value of 80, and the coating was still anchored to the base sheet of regenerated cellulose after being immersed in water at 25° C. for 48 hours.

When the same base sheet was coated under the same conditions with a similar composition, replacing the butadiene polymer with butyl methacrylate polymer, that is, a composition having 94 parts of butyl methacrylate polymer and the same amounts of paraffin wax, cobalt naphthenate and toluene, a sheet was obtained which had a permeability value of 20 and which had its coating loosened by four hours immersion in water under the aforementioned conditions.

Example XIII

A web of regenerated cellulose was coated with a solution consisting of:

| | Parts |
|---|---|
| Butadiene polymer | 45 |
| Paraffin wax (M. P. 60° C.) | 10 |
| Pliolite resin | 45 |
| Cobalt naphthenate (as Co) | 0.03 |
| Manganese naphthenate (as Mn) | 0.03 |
| Toluene | 730 |

The solvent was evaporated at about 100° C., and the coated sheet maintained at this temperature until "cured," that is, until the coating had become relatively non-tacky. This required approximately 8 minutes. The resulting web having only this single coat had a permeability value of 230, and the coating was still anchored to the base sheet of regenerated cellulose after being immersed in water at 25° C. for 24 hours.

When the same base sheet was coated under the same conditions with a similar composition, replacing the butadiene polymer with Pliolite resin, that is, a composition having 90 parts Pliolite resin and the same amounts of paraffin and toluene, a sheet was obtained which had a permeability value of 5, and which had its coating loosened by 4 hours immersion in water under the aforementioned conditions.

The viscous light yellow oily butadiene polymer utilized in the specific examples was obtained by heating the mixture consisting of:

| | Parts |
|---|---|
| Butadiene | 3600 |
| Benzene | 780 |
| n-Butyraldehyde | 120 |
| Catalyst (equal parts of copper acetate/$H_2O$, copper metal, iron powder, ferrous oxide) | 480 | for 5 hours at 160° C. with stirring, cooling, diluting with 6650 parts of benzene, filtering off the catalyst, treating the filtrate with carbon black, evaporating off the benzene and by-product vinyl-cyclohexene. This product flowed slowly at room temperature (20° C.), and when diluted to a 58% solution in a high boiling aliphatic solvent (V. M. & P. naphtha—B. P. 95°–195° C.) had a viscosity of W in the Gardner-Holdt scale at 70° F. Its iodine number was slightly greater than 400 (e. g. 407–415).

In general the polymeric substances employed as anchoring media in this invention can be obtained by polymerizing conjugated diolefinic hydrocarbons such as butadiene or its various open chain homologs like isoprene, methyl butadiene and 2:3-di-methyl butadiene. The low condensed soluble polymer products from butadiene have been found to be especially well suited for the purposes of this invention.

Preferably the polymerization is effected under pressure at elevated temperatures in the presence of catalysts such as sodium or salts of copper with weak acids in the presence of a carbonyl compound. The presence of an inert organic liquid (solvent) is desirable and is preferred. The details of the processes for the preparation of the bodies are extensive and in the interest of brevity are omitted from this specification. In general any of the products disclosed in and/or produced according to U. S. A. patent applications, Serial Nos. 292,362 (filed August 28, 1939) and 297,955 (filed October 4, 1939) by Rothrock may be used. The butadiene polymers utilized in this invention are unlike the butadiene derivatives heretofore known. Previous attempts to polymerize butadiene and like substances have resulted in rubber or caoutchouc-like products. The products of this invention are uniform, viscous, and possess drying characteristics.

The polymers may be blown with air (or oxygen) before use, if desired. Such a treatment will decrease the effective curing time of the polymeric material for anchorage purposes. Furthermore, they may be blown to a greater extent, without gelling, than products such as the well known drying oils. This enables them to be put in a better condition for rapid coating composition application than the materials heretofore known. They may be applied without a drying catalyst, but such a procedure is not ordinarily employed because of the short drying times which are peculiar to the coating of cellulosic sheet.

The invention is not limited to cobalt and manganese naphthenates. Driers in general, for example, lead oleate, manganese rosinate, and the like, are quite satisfactory.

Although the moistureproofing coatings disclosed herein are especially applicable to sheets or films of regenerated cellulose (whether they be made by the viscose process, the cuprammonium process, or some other manufacturing technique), they may be used with varying degrees of desirableness on other bases. Sheets of cellulose ethers such as ethyl, benzyl, and glycol cellulose, cellulose esters such as cellulose nitrate and cellulose acetate, may be used. The lowly esterified cellulosic compositions and low substituted cellulose ethers (U. S. A. Patent 2,123,883 to Ellsworth) are especially suitable. Base films soluble in the solvent of the coating composition, are excluded. Other equivalent base materials are mentioned in the patents mentioned herein.

Modifying ingredients for the anchoring coat are described in the prior art patents, and in the interest of brevity a detailed description of the same is not given at this place. The polymers may be applied without the use of a solvent or any modifying material, if desired.

As will be apparent from the specific examples, the composition of the surface moistureproofing coating may vary widely (being based, for example, upon cellulose derivatives, rubber derivatives, resins, etc.). The applicability of other suitable moistureproofing coating compositions will be apparent to those skilled in the art.

A convenient test for anchorage is that utilized in the specific examples. It is carried out by immersing a strip of the coated, regenerated cellulose in water at 25° C., and noting the time in hours necessary for the coating to be sufficiently loosened to allow removal of the coating by rubbing with the fingers.

Moistureproofness, moistureproofing and moistureproof materials and expressions are defined in U. S. A. Patent No. 2,147,180 (Ubben). In the interest of brevity the definitions are not repeated here. The terms and expressions related thereto and employed herein are used in accordance with such definitions.

The present invention has the advantages of the anchored moistureproof coating compositions of the prior art patents, and in addition has several important features not heretofore known. Unlike the previously employed synthetic and natural drying oils, the butadiene polymers of the present invention produce an odorless film. These butadiene polymers dry extremely rapidly, which is not the case with drying oils. Drying oils "dry" relatively slowly, even in the presence of a drying catalyst.

The butadiene polymers cure to produce a nontoxic film, thereby permitting an anchorage process which is quite practical from a commercial viewpoint. In addition, when combined with moistureproofing agents, they produce anchored coatings having better transparency, surface characteristics and moistureproofness than any such material previously known.

In general, the coating compositions of the present invention, containing the diolefinic hydrocarbon polymers, are much harder and more wear-resistant than the previously known coating composition which contained drying oils. In addition, they set up and harden very much more rapidly than drying oils, and hence are much better suited for application by modern high-speed coating equipment.

As many apparently widely different embodiments of this invention may be made without departing from the spirit and scope thereof, it is to be understood that this invention is not limited to the specific embodiments thereof except as defined in the appended claims.

I claim:

1. In a method of moistureproofing cellulosic sheet material, the steps of coating the sheet material with oily viscous butadiene polymeric material, the said polymeric material being substantially identical with that obtained by polymerizing a member of the group consisting of butadiene and its open chain homologues under pressure at elevated temperatures in the presence of catalysts from the group consisting of sodium and salts of copper with weak acids in the presence of a carbonyl compound, to produce low condensed soluble polymer products, drying said coating and applying a moistureproofing coating composition on the first coating.

2. A moistureproof sheet wrapping material comprising a moistureproof coating anchored to a cellulosic base sheet with polymeric butadiene material, the said polymeric butadiene material being substantially identical with that obtained by polymerizing a member of the group consisting of butadiene and its open chain homologues under pressure at elevated temperatures in the presence of catalysts from the group consisting of sodium and salts of copper with weak acids in the presence of a carbonyl compound, to produce low condensed soluble polymer products.

3. A sheet material consisting of a regenerated cellulose base sheet coated with a moistureproof coating composition and a coating formed of a butadiene drying polymer disposed directly between said base sheet and said moistureproofing coating, the said butadiene drying polymer being substantially identical with that obtained by polymerizing a member of the group consisting of butadiene and its open chain homologues under pressure at elevated temperatures in the presence of catalysts from the group consisting of sodium and salts of copper with weak acids in the presence of a carbonyl compound, to produce low condensed soluble polymer products.

4. The process which comprises coating regenerated cellulose sheet with the butadiene drying polymer obtained by heating a mixture consisting of:

| | Parts |
|---|---|
| Butadiene | 3600 |
| Benzene | 780 |
| n-Butyraldehyde | 120 |
| Catalyst (equal parts of copper acetate/$H_2O$, copper metal, iron powder, ferrous oxide) | 480 | for 5 hours at 160° C. with stirring, cooling, diluting with 6650 parts benzene, filtering off the catalyst, treating the filtrate with carbon black, and evaporating off the benzene and by-product vinyl-cyclohexene; curing the coating material to produce a non-tacky anchoring coating; and thereafter top coating with a moistureproofing lacquer having the composition:

| | Parts |
|---|---|
| Nitrocellulose (11.6% N) | 60 |
| Paraffin wax (M. P. 60° C.) | 3 |
| Ester gum | 7 |
| Dicyclohexyl phthalate | 20 |
| Dibutyl phthalate | 10 |
| Ethyl acetate | 450 |
| Ethyl alcohol | 35 |
| Toluene | 245 | and thereafter removing the solvent from the lacquer.

5. The process which comprises coating regenerated cellulose sheet with the butadiene drying polymer obtained by heating a mixture consisting of:

| | Parts |
|---|---|
| Butadiene | 3600 |
| Benzene | 780 |
| n-Butyraldehyde | 120 |
| Catalyst (equal parts of copper acetate/H₂O, copper metal, iron powder, ferrous oxide) | 480 | for 5 hours at 160° C. with stirring, cooling, diluting with 6650 parts benzene, filtering off the catalyst, treating the filtrate with carbon black, and evaporating off the benzene and by-product vinyl-cyclohexene; curing the coating material to produce a non-tacky anchoring coat; and thereafter applying a moistureproofing coating comprising essentially nitrocellulose and paraffin wax.

6. The process which comprises coating regenerated cellulose sheet with the butadiene drying polymer obtained by heating a mixture consisting of:

| | Parts |
|---|---|
| Butadiene | 3600 |
| Benzene | 780 |
| n-Butyraldehyde | 120 |
| Catalyst (equal parts of copper acetate/H₂O, copper metal, iron powder, ferrous oxide) | 480 | for 5 hours at 160° C. with stirring, cooling, diluting with 6650 parts benzene, filtering off the catalyst, treating the filtrate with carbon black, and evaporating off the benzene and by-product vinyl-cyclohexene; curing the coating material to produce a non-tacky anchoring coat; and thereafter applying a moistureproofing coating.

7. The process which comprises coating regenerated cellulose sheet with the butadiene drying polymer obtained by polymerizing a member of the group consisting of butadiene and its open chain homologues under pressure at elevated temperatures in the presence of catalysts from the group consisting of sodium and salts of copper with weak acids in the presence of a carbonyl compound, to produce low condensed soluble polymer products, curing the coating material to produce a non-tacky anchoring coat, and thereafter applying a moisture-proofing coating.

8. A moistureproof sheet wrapping material comprising a cellulosic base sheet having a moistureproof coating, the coating on the base sheet comprising essentially a moistureproofing coating and polymeric butadiene material obtainable by heating a mixture consisting of:

| | Parts |
|---|---|
| Butadiene | 3600 |
| Benzene | 780 |
| n-Butyraldehyde | 120 |
| Catalyst (equal parts of copper acetate/H₂O, copper metal, iron powder, ferrous oxide) | 480 | for 5 hours at 160° C. with stirring, cooling, diluting with 6650 parts benzene, filtering off the catalyst, treating the filtrate with carbon black, and evaporating off the benzene and by-product vinyl-cyclohexene.

9. A moistureproof sheet wrapping material comprising essentially a regenerated cellulose sheet having thereon a cured butadiene drying polymer coating, said butadiene drying polymer being obtainable by heating a mixture consisting of:

| | Parts |
|---|---|
| Butadiene | 3600 |
| Benzene | 780 |
| n-Butyraldehyde | 120 |
| Catalyst (equal parts of copper acetate/H₂O, copper metal, iron powder, ferrous oxide) | 480 | for 5 hours at 160° C. with stirring, cooling, diluting with 6650 parts benzene, filtering off the catalyst, treating the filtrate with carbon black, and evaporating off the benzene and by-product vinyl-cyclohexene, and superimposed on the butadiene drying polymer coating a moistureproofing coating comprising essentially nitrocellulose and paraffin wax.

10. A moistureproof sheet wrapping material comprising essentially a regenerated cellulose sheet having thereon a cured butadiene drying polymer coating, said butadiene drying polymer being obtainable by heating a mixture consisting of:

| | Parts |
|---|---|
| Butadiene | 3600 |
| Benzene | 780 |
| n-Butyraldehyde | 120 |
| Catalyst (equal parts of copper acetate/H₂O, copper metal, iron powder, ferrous oxide) | 480 | for 5 hours at 160° C. with stirring, cooling, diluting with 6650 parts benzene, filtering off the catalyst, treating the filtrate with carbon black, and evaporating off the benzene and by-product vinyl-cyclohexene, and superimposed on the butadiene drying polymer coating a moistureproofing coating consisting of:

| | Parts |
|---|---|
| Nitrocellulose (11.6% N) | 60 |
| Paraffin wax (M. P. 60° C.) | 3 |
| Ester gum | 7 |
| Dicyclohexyl phthalate | 20 |
| Dibutyl phthalate | 10 |

JAMES A. MITCHELL.